(Model.)
W. J. WATSON.
Stump Puller.
No. 234,357. Patented Nov. 9, 1880.
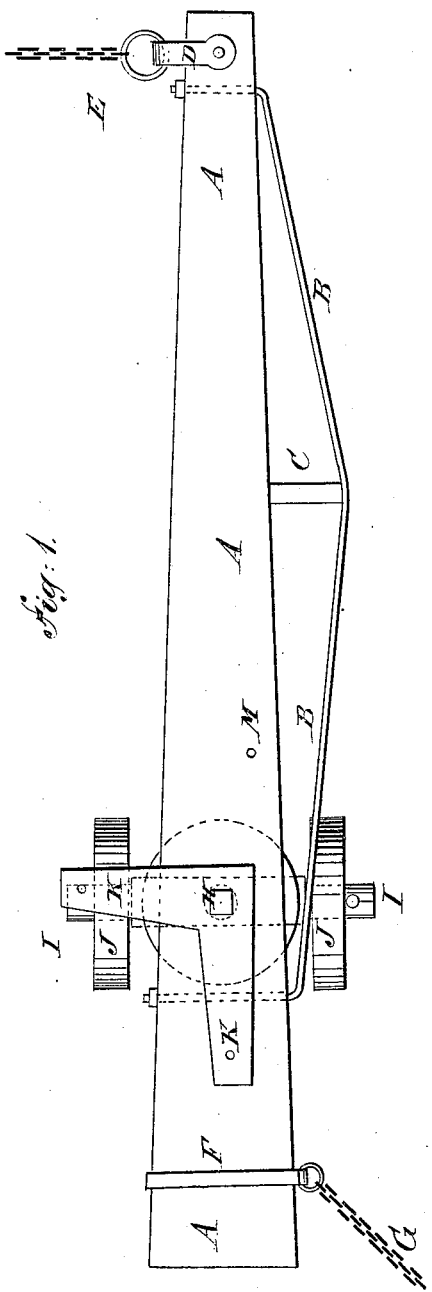
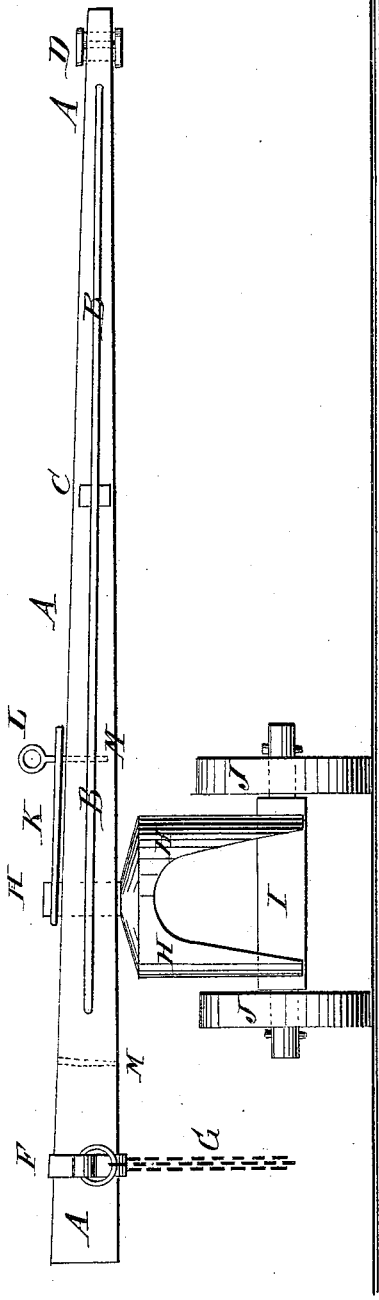
WITNESSES:
Chas. Nida
A. Sedgwick
INVENTOR:
W. J. Watson
BY Munn & Co
ATTORNEYS.

UNITED STATES PATENT OFFICE.

WILLIAM J. WATSON, OF MARION, SOUTH CAROLINA.

STUMP-PULLER.

SPECIFICATION forming part of Letters Patent No. 234,357, dated November 9, 1880.

Application filed July 28, 1880. (Model.)

*To all whom it may concern:*

Be it known that I, WILLIAM JOSEPH WATSON, of Marion, in the county of Marion and State of South Carolina, have invented a new and useful Improvement in Stump-Pullers, of which the following is a specification.

Figure 1 is a plan view of the improvement, and Fig. 2 is a rear elevation.

Similar letters of reference indicate corresponding parts.

The object of this invention is to furnish stump-pullers so constructed that they can be readily applied to the stumps, and which will be powerful in operation and will not be liable to get out of order.

The invention consists in constructing a stump-puller of a lever strengthened by a truss-rod and stud, and having a clevis at its forward end for the attachment of the draft and a chain at its rear end to be attached to a stump, a swiveled standard for connecting wheels, and an axle with the lever to carry it, and a right-angled lever for adjusting the carriage and fastening it in place, as will be hereinafter fully described.

A is a lever of such a length as will give the required leverage and of such a size as will give the required strength, reference being had to the size of the stumps to be pulled. The lever A is strengthened against being bent or broken by a truss-rod, B, placed upon the rear side of the said lever, and the ends of which are firmly secured to the end parts of the said lever.

Between the middle part of the truss-rod B and the middle part of the lever A is interposed a stud, C, as shown in Fig. 1. To the forward end of the lever A is attached a clevis, D, to which the power is applied by means of a chain, E, or other suitable means. To the rear end of the lever A is firmly attached, by means of a band, F, passing around the said end, or by other suitable means, the end of a chain, G, of such a length that it can be passed three or four times around the stump to be pulled, and which has a hook at its other end.

To the lever A, at a little distance from its rear end, is swiveled a standard, H, the forked lower end, of which is firmly attached to the short axle I. The axle I is provided with small wheels J, which are made with wide rims to prevent them from sinking into the ground.

The upper end of the journal of the standard H is squared, and to it is attached the angle of a right-angled lever, K, which has holes in the ends of its arms to receive a pin, L. In the lever A, upon the opposite sides of the standard H, are formed two holes, M, into one or the other of which the pin L is inserted, according as the lever K is adjusted.

In using the stump-puller it is drawn up to a stump and the chain G is passed three or four times around the stump, and its hook is hooked into a link of the said chain. The chain is then secured against slipping upon the stump by driving a pin through one of its links and into the said stump. The lever K is then adjusted to bring the axle I parallel with the lever A, or nearly so, and is secured in place by the pin L. The team is then driven in a circle around the stump, twisting it loose. When the stump is fully loosened the lever K is adjusted to bring the axle I at right angles with the lever A, and the stump is drawn off. The puller is then taken to another stump and the operation is repeated.

Having thus described my invention, what I claim as new, and desire to secure by Letters Patent, is—

In a stump-puller, the combination of the wheels and axle J I, the standard H, the lever A, fulcrumed on said standard, and the angle-bar K, the latter made fast, near the vertex of the angle, to the upper end of the standard, and having either arm attachable by a pin, L, to the axle I and lever A, as and for the purpose specified.

WILLIAM JOSEPH WATSON.

Witnesses:
H. L. REAVES,
JOHN H. DAVIS.